United States Patent
Lunttila et al.

(10) Patent No.: US 10,708,802 B2
(45) Date of Patent: Jul. 7, 2020

(54) MULTI-CELL PERIODIC/SPS CSI REPORTING FOR WIRELESS NETWORK

(71) Applicant: Nokia Technologies Oy, Espoo (FI)

(72) Inventors: Timo Lunttila, Espoo (FI); Mihai Enescu, Espoo (FI); Esa Tiirola, Kempele (FI); Kari Hooli, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/234,106

(22) Filed: Dec. 27, 2018

(65) Prior Publication Data

US 2019/0223036 A1 Jul. 18, 2019

Related U.S. Application Data

(60) Provisional application No. 62/616,709, filed on Jan. 12, 2018.

(51) Int. Cl.
*H04W 24/10* (2009.01)
*H04W 72/04* (2009.01)
*H04W 72/12* (2009.01)
*H04L 5/00* (2006.01)

(52) U.S. Cl.
CPC .......... *H04W 24/10* (2013.01); *H04L 5/0057* (2013.01); *H04L 5/0064* (2013.01); *H04L 5/0094* (2013.01); *H04W 72/042* (2013.01); *H04W 72/044* (2013.01); *H04W 72/1242* (2013.01); *H04L 5/0007* (2013.01)

(58) Field of Classification Search
None
See application file for complete search history.

(56) References Cited

U.S. PATENT DOCUMENTS

| 2012/0140708 | A1 | 6/2012 | Choudhury et al. |
| 2013/0258874 | A1* | 10/2013 | Khoshnevis ......... H04L 5/0057 370/252 |
| 2014/0010126 | A1 | 1/2014 | Sayana et al. |
| 2018/0062724 | A1* | 3/2018 | Onggosanusi ....... H04B 7/0478 |
| 2018/0324787 | A1* | 11/2018 | Yin ................... H04W 72/0413 |

(Continued)

OTHER PUBLICATIONS

"3rd Generation Partnership Project; Technical Specification Group Radio Access Network; NR; Physical layer procedures for control (Release 15)", 3GPP TS 38.213 V15.0.0, Dec. 2012, pp. 1-56.

(Continued)

*Primary Examiner* — Brian S Roberts
(74) *Attorney, Agent, or Firm* — Nokia Technologies Oy

(57) ABSTRACT

In accordance with an example embodiment, there is disclosed a method comprising: receiving, by a user device, from at least one base station, at least two CSI reporting configurations for at least one of periodic and semi-persistent CSI reporting; determining that at least two CSI reports are to be reported for the at least two CSI reporting configurations in a slot; determining whether PUCCH resources for the at least two CSI reporting configurations are overlapping in time on a carrier; and ranking different CSI reports associated with each of the at least two CSI reporting configurations in a priority order in response to a determination that at least two PUCCH resources associated with the at least two CSI reporting configurations overlap in time at least partially.

18 Claims, 4 Drawing Sheets

(56) References Cited

U.S. PATENT DOCUMENTS

2018/0368169 A1* 12/2018 Jung ................. H04W 72/1289
2019/0223036 A1*  7/2019 Lunttila ................ H04L 5/0057

OTHER PUBLICATIONS

"3rd Generation Partnership Project; Technical Specification Group Radio Access Network; NR; Physical layer procedures for data (Release 15)", 3GPP TS 38.214 V15.0.0, Dec. 2017, pp. 1-71.
Extended European Search Report received for corresponding European Patent Application No. 18212502.1, dated May 15, 2019, 10 pages.
"Remaining Issues on CSI Reporting", 3GPP TSG RAN WG1 Meeting 91, R1-1720802, Agenda Item : 7.2.2.2, NTT DOCOMO, Nov. 27-Dec. 1, 2017, pp. 1-6.
"Details of CSI Reporting on PUCCH/PUSCH", 3GPP TSG RAN WG1 Meeting #90bis, R1-1717300, Agenda Item: 7.2.2.2, Huawei, Oct. 9-13, 2017, 3 pages.
"On the Remaining Details of Long PUCCH for UCI More than 2 Bits", 3GPP TSG RAN WG1 #91, R1-1721475, Agenda item: 7.3.2.2.2, Nokia, Nov. 27-Dec. 1, 2017, 15 pages.
Office action received for corresponding European Patent Application No. 18212502.1, dated May 14, 2020, 7 pages.
"Periodic CSI reporting for Carrier Aggregation Enhancement Beyond 5 Carriers", 3GPP TSG-RAN WG1 Meeting #83, R1-157128, Agenda item: 6.2.2.1.3, Nokia Networks, Nov. 15- 22, 2015, 3 pages.

* cited by examiner

| PUCCH Format 205 | | PUCCH Format 0 | PUCCH Format 1 | PUCCH Format 2 | PUCCH Format 3 | PUCCH Format 4 |
|---|---|---|---|---|---|---|
| Starting symbol 210 | Configurability | √ | √ | √ | √ | √ |
| | Value range | 0-13 | 0 – 10 | 0-13 | 0 – 10 | 0 – 10 |
| Number of symbols in a slot 215 | Configurability | √ | √ | √ | √ | √ |
| | Value range | 1, 2 | 4 – 14 | 1, 2 | 4 – 14 | 4 – 14 |
| Index for identifying starting PRB 220 | Configurability | √ | √ | √ | √ | √ |
| | Value range | 0 - 274 | 0 - 274 | 0 - 274 | 0 - 274 | 0 - 274 |
| Number of PRBs 225 | Configurability | N.A. | N.A. | √ | √ | N.A. |
| | Value range | N.A. (Default is 1) | N.A. (Default is 1) | 1 – 16 | 1 - 6, 8 - 10, 12, 15, 16 | N.A. (Default is 1) |
| Enabling a frequency hopping 230 | Configurability | √ | √ | √ | √ | √ |
| | Value range | On/Off (only for 2 symbol) | On/Off | On/Off (only for 2 symbol) | On/Off | On/Off |
| Frequency resource of 2$^{nd}$ hop 235 | Configurability | √ | √ | √ | √ | √ |
| | Value range | 0 - 274 | 0 - 274 | 0 - 274 | 0 - 274 | 0 – 274 |
| Index of initial cyclic shift 240 | Configurability | √ | √ | N.A. | N.A. | N.A. |
| | Value range | 0 – 11 | 0 – 11 | N.A. | 0 – 11 | 0 – 11 |
| Index of time-domain OCC 245 | Configurability | N.A. | √ | N.A. | N.A. | N.A. |
| | Value range | N.A. | 0 - 6 | N.A. | N.A. | N.A. |
| 77Length of Pre-DFT OCC 250 | Configurability | N.A. | N.A. | N.A. | N.A. | √ |
| | Value range | N.A. | N.A. | N.A. | N.A. | 2, 4 |
| Index of Pre-DFT OCC 255 | Configurability | N.A. | N.A. | N.A. | N.A. | √ |
| | Value range | N.A. | N.A. | N.A. | N.A. | 0, 1, 2, 3 |

MULTI-CELL PERIODIC/SPS CSI REPORTING FOR WIRELESS NETWORK

TECHNICAL FIELD

The teachings in accordance with the exemplary embodiments of this invention relate generally to signalling in radio systems, in particular to periodic reporting of channel state information for wideband carriers.

BACKGROUND

5G/New Radio (NR) supports periodic and semi-persistent CSI reporting on PUCCH. More specifically, the CSI reports may be carried on PUCCH formats 2 (Short PUCCH), 3, and 4 (Long PUCCH). Various types of CSI reports are supported in NR. The following combinations of channel state information are supported CRI-RI-PMI-CQI, CRI-RI-i1, CRI-RI-i1-CQI, CRI-RI-CQI, CRI, and CRI-RSRP. Additionally, in addition to channel state information, a UE can also be configured to report a L1 RSRP (reference signal received power) report, using a similar mechanism.

Similarly to LTE, NR supports carrier aggregation (CA). Moreover, NR also includes a concept of bandwidth parts (BWP), in which a given carrier may be divided into multiple BW part, and a UE may monitor only such a BW part instead of a full carrier to support UE power saving (multiple BWP per UE), support of UEs with capability smaller than the network carrier (single BWP per UE) and load balancing on a network carrier. The CSI reporting in NR may be either carrier or BW part specific, for example, a CSI report may provide information about one carrier or a BW part but not multiple carriers. However, a UE may be configured to feedback CSI for multiple carriers, such that separate CSI measurement link configuration (MeasLinkConfig) is provided for each one. A MeasLinkConfig links together the resources to be measured (for example, CSI-RS or SSB (Synchronization Signal Block)), the CSI reporting type, and the UL (PUCCH) resources used for reporting the CSI.

Unlike in, for example, LTE, in NR all CSI reports on PUCCH are self-contained, meaning that different parts of a CSI report are all transmitted within the same slot.

Certain abbreviations that may be found in the description and/or in the Figures are herewith defined as follows:
  3GPP 3rd Generation Partnership Project
  ARI ACK/NACK resource indicator
  BW Bandwidth
  BWP Bandwidth Part
  CC Component Carrier
  CG Cell Group
  CQI Channel quality indicator
  CSI Channel State Information
  DCI Downlink Control Information
  DL Downlink
  gNB 5G Enhanced Node B (Base station)
  HARQ-ACK Hybrid Automatic Repeat Request Acknowledgement
  L1 (Radio) Layer 1
  LTE long term evolution
  MME mobility management entity
  NCE network control element
  NR New radio
  NR-PDCCH New radio Physical Downlink Control Channel
  N/W Network
  Pcell Primary Cell
  PMI Precoding Matrix
  PRB Physical resource blocks
  PScell Primary Scell
  PUCCH Physical Uplink Control Channel
  Rel Release
  RI Rank Indicator
  RRC Radio Resource Control
  RSRP Reference Signal Received Power
  SPS Semi-Persistent Scheduling
  SSB Synchronization Signal Block
  SR Scheduling Request
  UE User Equipment
  UL Uplink

SUMMARY

Various aspects of examples of the invention are set out in the claims.

According to a first aspect of the present invention, a method comprising: receiving, by a user device, from at least one base station, at least two CSI reporting configurations for at least one of periodic and semi-persistent CSI reporting; determining that at least two CSI reports are to be reported for the at least two CSI reporting configurations in a slot; determining whether PUCCH resources for the at least two CSI reporting configurations are overlapping in time on a carrier; and ranking different CSI reports associated with each of the at least two CSI reporting configurations in a priority order in response to a determination that at least two PUCCH resources associated with the at least two CSI reporting configurations overlap in time at least partially.

According to a second aspect of the present invention, an apparatus comprising: at least one processor; and at least one memory including computer program code, wherein the at least one memory and the computer program code are configured to, with the at least one processor, cause the apparatus to perform at least the following: receive, from at least one base station, at least two CSI reporting configurations for at least one of periodic and semi-persistent CSI reporting; determine that at least two CSI reports are to be reported for the at least two CSI reporting configurations in a slot; determine whether PUCCH resources for the at least two CSI reporting configurations are overlapping in time on a carrier; and rank different CSI reports associated with each of the at least two CSI reporting configurations in a priority order in response to a determination that at least two PUCCH resources associated with the at least two CSI reporting configurations overlap in time at least partially.

According to a third aspect of the present invention, a computer program product comprising a non-transitory computer-readable medium bearing computer program code embodied therein for use with a computer, the computer program code comprising: receiving from at least one base station, at least two CSI reporting configurations for at least one of periodic and semi-persistent CSI reporting; determining that at least two CSI reports are to be reported for the at least two CSI reporting configurations in a slot; determining whether PUCCH resources for the at least two CSI reporting configurations are overlapping in time on a carrier; and ranking different CSI reports associated with each of the at least two CSI reporting configurations in a priority order in response to a determination that at least two PUCCH resources associated with the at least two CSI reporting configurations overlap in time at least partially.

According to a fourth aspect of the present invention, a method comprising: transmitting, by a base station, to at least one user device, at least two CSI reporting configurations for at least one of periodic and semi-persistent CSI reporting; determining that at least two CSI reports are to be reported for the at least two CSI reporting configurations in a slot; determining whether PUCCH resources for the at least two CSI reporting configurations are overlapping in time on a carrier; and receiving all CSI reports on PUCCHs associated with the at least two CSI reporting configurations in response to a determination that none of the PUCCH resources are overlapping.

According to a fifth aspect of the present invention, an apparatus comprising: at least one processor; and at least one memory including computer program code, wherein the at least one memory and the computer program code are configured to, with the at least one processor, cause the apparatus to perform at least the following: transmit to at least one user device, at least two CSI reporting configurations for at least one of periodic and semi-persistent CSI reporting; determine that at least two CSI reports are to be reported for the at least two CSI reporting configurations in a slot; determine whether PUCCH resources for the at least two CSI reporting configurations are overlapping in time on a carrier; and receive all CSI reports on PUCCHs associated with the at least two CSI reporting configurations in response to a determination that none of the PUCCH resources are overlapping.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 2 shows an example table of supported CSI reports in NR;

DETAILED DESCRIPTION

In the example embodiments as described herein a method and apparatus ensuring that measurement gap matches to the reference symbols for which the measurement gap was originally meant for in instances in which numerology changes.

Figure 1:
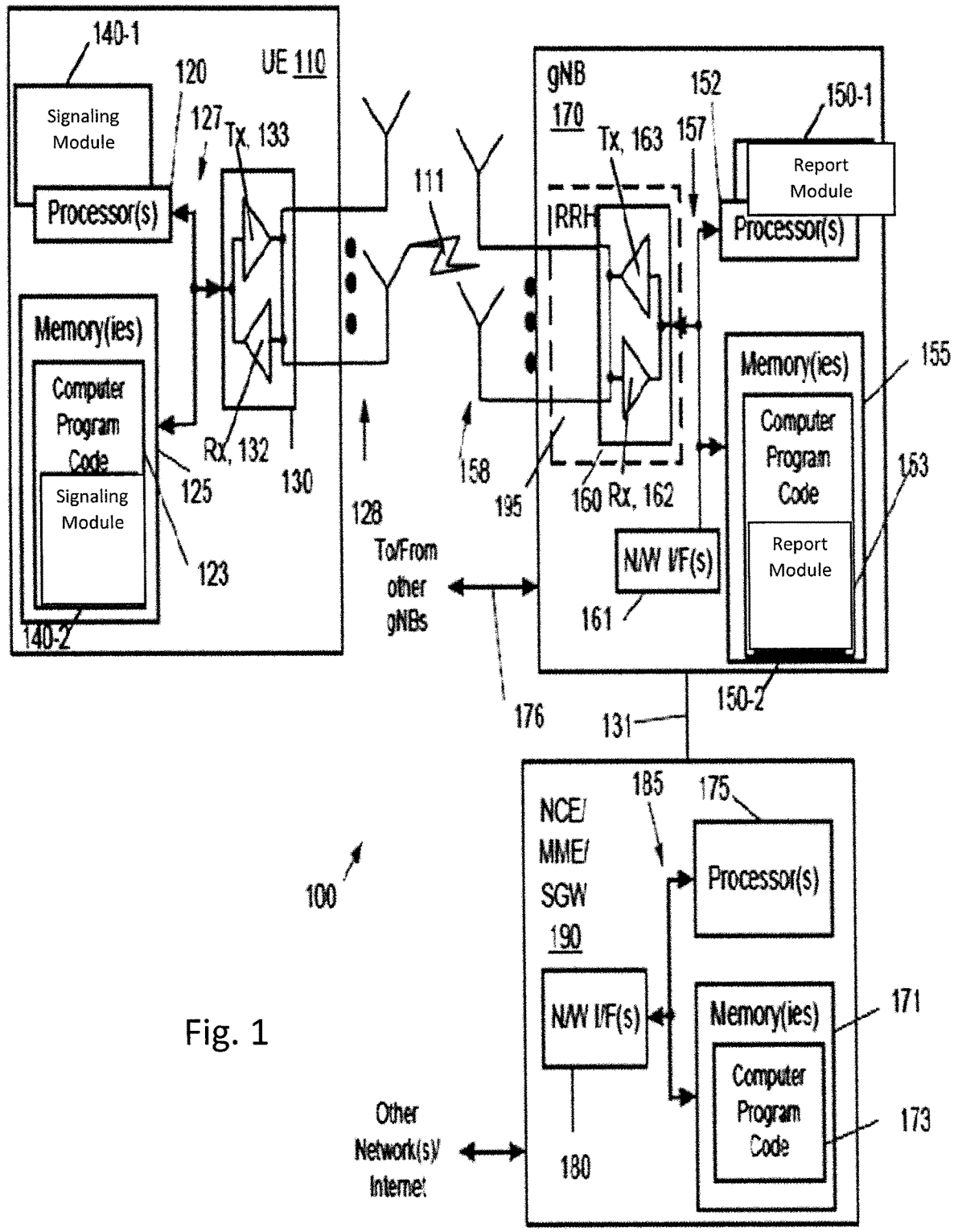
FIG. 1 is a block diagram of one possible and non-limiting example system in which the example embodiments may be practiced.

Turning to FIG. 1, this figure shows a block diagram of one possible and non-limiting example system in which the example embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123.

The UE 110 includes a signaling module 140, comprising one of or both parts 140-1 and/or 140-2, which may be implemented in a number of ways. The signaling module 140 may be implemented in hardware as signaling module 140-1, such as being implemented as part of the one or more processors 120. The signaling module 140-1 may be implemented also as an integrated circuit or through other hardware such as a programmable gate array. In another example, the signaling module 140 may be implemented as signaling module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The gNB (NR/5G Node B but possibly an evolved NodeB) 170 is a base station (e.g., for LTE, long term evolution) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170 includes a report module 150, comprising one of or both parts 150-1 and/or 150-2, which may be implemented in a number of ways. The report module 150 may be implemented in hardware as report module 150-1, such as being implemented as part of the one or more processors 152. The report module 150-1 may be implemented also as an integrated circuit or through other hardware such as a programmable gate array. In another example, the report module 150 may be implemented as report module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, e.g., link 176. The link 176 may be wired or wireless or both and may implement, for example, an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB 170 that forms the cell will perform the functions. The cell makes up part of a gNB 170. That is, there can be multiple cells per gNB 170.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (for example, an application specific integrated circuit), or a combination of software and hardware. In an example of an embodiment, the software (for example, application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, for example, in FIG. 1. A computer-readable medium may comprise a computer-readable storage medium or other device that may be any media or means that can contain or store the instructions for use by or in connection with an instruction execution system, apparatus, or device, such as a computer.

Having thus introduced one suitable but non-limiting technical context for the practice of the example embodiments of this invention, the example embodiments will now be described with greater specificity.

As shown in table 200, different PUCCH formats 205 may be supported for CSI reports. Each of the PUCCH formats 205 (PUCCH format 0, PUCCH format 1, PUCCH format 2, PUCCH format 3, PUCCH format 4) may have corresponding parameters including a starting symbol 210, number of symbols in a slot 215, index for identifying PRB 220, Number of PRBs 225, Enabling a frequency hopping 230, Frequency resource of $2^{nd}$ hop (if frequency hopping is enabled) 235, Index of initial cyclic shift 240, Index of time-domain OCC 245, Length of Pre-DFT OCC 250, and Index of Pre-DFT OCC 255.

Each of the corresponding parameters may have an associated configurability and value range for each of the PUCCH formats 205. For example, as shown in table 200, starting symbol 210 may be configurable for all PUCCH formats (denoted by check marks in table 200) and may have a value range of 0-13 for PUCCH format 0, 0-10 for PUCCH format 1, etc.

Multiplexing of periodic CSI reports for, for example, different carriers or cells may be performed in some example embodiments. For a given PUCCH format, higher layer parameter PUCCH-F2-maximum-coderate (or . . . F3, or . . . F4, for example) indicates the maximum supported code rate, based on which the maximum number of bits is calculated together with other necessary parameters, for example number of symbols in a slot 215 and, in some instances, number of PRBs 225. This procedure is described in NR standards technical specification (TS) 38.213, Section 9.2.5.2 for simultaneous transmission of A/N and CSI, and the same principle may be applied to CSI only cases with required (or necessary) modifications. The procedure becomes different from with A/N since the PUCCH resource is expected to be semi-static and not dependent on DCI.

After the maximum number of bits to be reported is calculated based on the maximum code rate, and other parameters such as the number of symbols or PRBs, and if the total number of CSI bits exceeds the maximum, some of the reports are dropped. The example embodiments determine the priority order (ranking) for different CSI reports, such that the reports that provide most useful information for the network are transmitted with greatest likelihood.

From point of view of standards, the example embodiments reconcile the discrepancy between the NR standards TS 38.213 and 38.214. While NR standard TS 38.213 describes how HARQ-ACKs, Scheduling Requests (SR) and CSIs are multiplexed, the example embodiments provide corresponding rules (which may be provided as description supplementing NR standards TS 38.214) for the case of multiple CSI reports without HARQ-ACK or SR.

Figure 3:
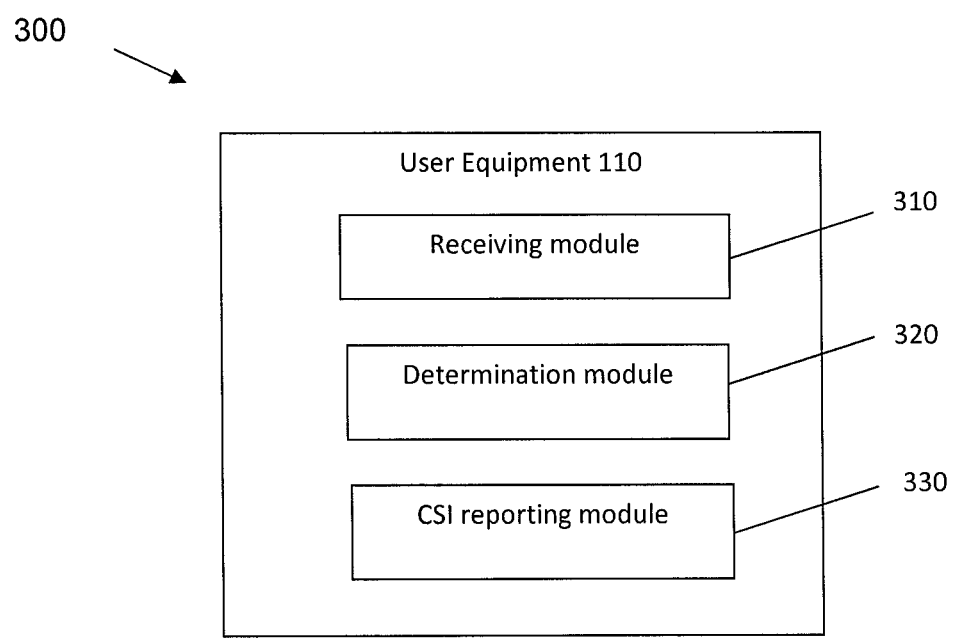
FIG. 3 shows a functional block diagram of a user equipment.

FIG. 3 illustrates a functional block diagram of a user equipment 110. As shown in FIG. 3, user equipment 110 includes a receiving module 310, a determination module 320, and a CSI reporting module 330.

In LTE Rel-10 (carrier aggregation), only one CSI report may be reported at a time, and all CSI reports except the highest-priority one are dropped. The reports are firstly ranked according to the content, such that, for example, reports containing Rank Indicator (RI) have a higher priority than reports containing CQI or PMI. When multiple reports of a same type coincide, the report for the DL cell with lowest serving Cell ID is prioritized, for example, PCell as the highest priority.

The basic principles for multi-cell periodic CSI reporting defined in LTE Rel-10 carrier remained unchanged until LTE Rel-13. LTE Rel-13 introduces multi-cell periodic CSI reporting, for example, a possibility to multiplex CSI reports for multiple cells into one PUCCH transmission. Multi-cell periodic CSI reporting in LTE Rel-13 include basic principles such as per-cell configuration of periodic CSI, Up to two UE specific configuration(s) for multi P-CSI transmission ("multi P-CSI resource"), In a subframe where only one periodic CSI occurs, PUCCH format 2 is used as in Rel-12, and in a subframe where more than one periodic CSI occur, one of the multi P-CSI resource(s) is used.

NR uses a similar approach as LTE Rel-13. However, there are some differences. LTE does not support bandwidths parts, different PUCCH durations, or L1-RSRP measurement reporting. L1-RSRP relates to a beamforming scenario where UE 110 is reporting up-to 4 CRIs (CSI Resource index or CSI resource set index) or SSB resource indicators. L1-RSRP may assist, for example, beam selection for PDCCH. LTE does not support semi-persistent CSI reporting on PUCCH. LTE does not support different types of PUCCH formats for (single-cell) CSI reporting. To address these differences, the example embodiments enhance periodic (and semi-persistent) CSI reporting in NR compared to LTE.

The example embodiments provide a set of rules for prioritizing (ranking) CSI periodic or semi-persistent CSI reports of various types, associated with different cells (carriers) and/or bandwidth parts, and a procedure for transmitting the prioritized reports with different possible PUCCH configurations.

The procedure takes into account different CSI reporting types (periodic/semi persistent), CSI report contents (RSRP, CRI, RI, CQI, PMI), and PUCCH channel formats (short and long PUCCH), PUCCH resources for the CSI reports, and in particular whether they overlap or not. The solution allows for reporting multiple periodic or semi-persistent CSI reports in one slot.

The UE 110 may implement the procedure as follows:

Receiving module 310 may receive, from the gNodeB 170 (via RRC signaling), at least two CSI reporting configurations for periodic and/or semi-persistent CSI reporting, each associated with a reportConfigId. Each configuration may include the PUCCH resource for CSI reporting (and also the format for CSI reporting). Each configuration may also include a configurable periodicity and slot offset.

Receiving module 310 may optionally receive from the gNodeB 170 (via RRC signaling), at least one multi-CSI reporting configuration. Each multi-CSI reporting configuration includes one or more of:

PUCCH format;

PUCCH resource allocation, including starting point and duration for PUCCH;

Slot configuration, for example, the periodicity and slot offset, or a bitmap; and Maximum code rate.

Determination module 320 may determine that at least two CSI reports are to be reported for at least two CSI reporting configurations (for example, at least two reportConfigIds) in a slot.

Determination module 320 may determine whether the PUCCH resources for the at least two CSI reporting configurations are overlapping in time or not. If none of the PUCCH resources overlap with each other, determination module 320 may transmit all PUCCHs associated with the CSI reporting configurations. Optionally, if a CSI reporting configuration associated to a long PUCCH overlaps with another CSI reporting configuration associated to a short PUCCH, determination module 320 may puncture (for example, determine separate sections) or rate match the long PUCCH corresponding to the overlapping part, and consider them as two non-overlapping CSI reporting configurations. In the rate matching operation, the number of resource elements available for long PUCCH is determined according to non-overlapping portion of the long PUCCH (with respect to short PUCCH). Rate matching may also impact the CSI dropping since the rate matching will increase the coding rate with given CSI payload (compared to the case without rate matching). Both short PUCCH and long PUCCH may be transmitted during the same slot. This option may be enabled or disabled in the CSI reporting configuration.

If at least two PUCCH resources associated with CSI reporting configurations overlap in time at least partially, determination module 320 may rank the different CSI reports associated with each CSI reporting configuration in a priority order, wherein the priority order comprises one or more of:

Giving reports containing a L1-RSRP or only a CRI a higher priority than for other reports (this may be beneficial since this type of a report is expected to be transmitted less often than other types of report and dropping such reports would cause a long delay in delivery of the related information);

Giving reports containing a semi-persistent CSI reports a higher priority than for periodic CSI reports (this may be beneficial since semi-persistent reports are activated for transmission only when needed, where periodic reports are configured semi-statically and may sometimes be transmitted even if the network has no strict need for them);

Giving the reports for the PCell or the PSCell a higher priority than for other reports (for other cells or carriers); and Giving the reports configured to be transmitted with a larger amount of PUCCH resources or with a lower coding rate a higher priority than for other reports (this may be beneficial since a larger amount of resources or lower coding rate may be used to improve the reliability of the reports and the network 100 may operate more efficiently and/or effectively with reports that require high reliability (the network 100 may likely not want reports requiring high reliability to be dropped)).

Ranking the reports according to ascending or descending configuration or measurement identity (or index), such as MeasLinkConfig/CSI-measId.

After ranking the at least two CSI reports for the at least two CSI reporting configurations in a priority order, if the UE 110 has not received any multi-CSI reporting configuration, or the multi-CSI reporting configuration is not valid for the given slot, CSI reporting module 330 may drop all CSI reports except the one with highest priority, which is transmitted on the PUCCH resource configured for it.

If the UE 110 has received one multi-CSI reporting configuration which is valid for the given slot, CSI reporting module 330 may calculate, based on the Maximum code rate and the PUCCH resource allocation the maximum number of bits supported for CSI reporting. CSI reporting module 330 may select as many highest-priority reports for transmission as possible without exceeding the maximum number of bits supported for CSI reporting, and drop the rest of the reports.

If the UE 110 has received at least two multi-CSI reporting configurations valid for the given slot, CSI reporting module 330 may determine whether the PUCCH resources for the at least two multi-CSI reporting configurations are overlapping in time on the same carrier or not, that is whether the PUCCH resources are on the same carrier and occupy at least some of the same symbols on the same or different PRBs. In response to a determination that a calculated maximum number of bits for any of the at least two multi-CSI reporting configurations is smaller than the total number of bits in the at least two CSI reports that are to be reported for the at least two CSI reporting configurations in a slot, CSI reporting module 330 may keep the multi-CSI reporting configuration with largest amount of resources and drop the other ones. In other words, if none of the multi-CSI configurations have enough bits, CSI reporting module 330 may keep the configuration with largest amount of resources. In contrast (for example, the opposite case) if one or more multi-CSI configurations have enough bits for conveying all colliding CSI reports, CSI reporting module 330 may keep the multi-CSI configurations (having enough bits) with smallest number of resources. Differently stated, if the calculated maximum number of bits for any of the at least two multi-CSI reporting configurations is larger or equal to the total number of bits in the at least two CSI reports that are to be reported for the at least two CSI reporting configurations in a slot. CSI reporting module 330 may keep a multi-CSI reporting configuration with a maximum number of bits larger or equal to the total number of bits in the at least two CSI reports that are to be reported for the at least two CSI reporting configurations in a slot with a smallest amount of resources in response to a determination that the PUCCH resources for at least two of the at least two multi-CSI reporting configurations are overlapping. This may thereby avoid excess usage of resources for multi-CSI configurations.

Optionally, if a multi-CSI reporting configuration associated to a long PUCCH overlaps with another multi-CSI reporting configuration associated to a short PUCCH, CSI reporting module 330 may puncture or rate-match the long PUCCH corresponding to the overlapping part, and consider them as two non-overlapping multi-CSI reporting configurations (for example, CSI reporting module 330 may operate according to the following paragraph).

If two or more multi-CSI reporting configurations in a given slot have non-overlapping PUCCH resources, CSI reporting module 330 may use both configurations for transmitting CSI reports in that slot. CSI reporting module 330 may calculate the maximum number of bits supported for CSI reporting separately for each multi-CSI reporting configuration based on the respective maximum code rate and other parameters such as the number of PUCCH symbols and PRBs.

According to an example embodiment, CSI reporting module 330 may select as many highest-priority reports for transmission as possible without exceeding the maximum number of bits supported for CSI reporting for the first (non-overlapping) multi-CSI reporting configuration. After that, CSI reporting module 330 may map the CSI reports with the next highest priority to the second multi-CSI reporting configuration, and so on. In some instances, CSI reporting module 330 may optimize the CSI content between multiple multi-CSI reporting configurations. For example, in order to maximize the (frequency/interference) diversity, CSI reporting module 330 may transmit the most important CSI (such as L1-RSRP) via multiple multi-CSI reporting configurations.

Finally, CSI reporting module 330 may drop the CSI reports not fitting into CSI resources of any of the (non-overlapping) multi-CSI reporting configurations.

Figure 4:
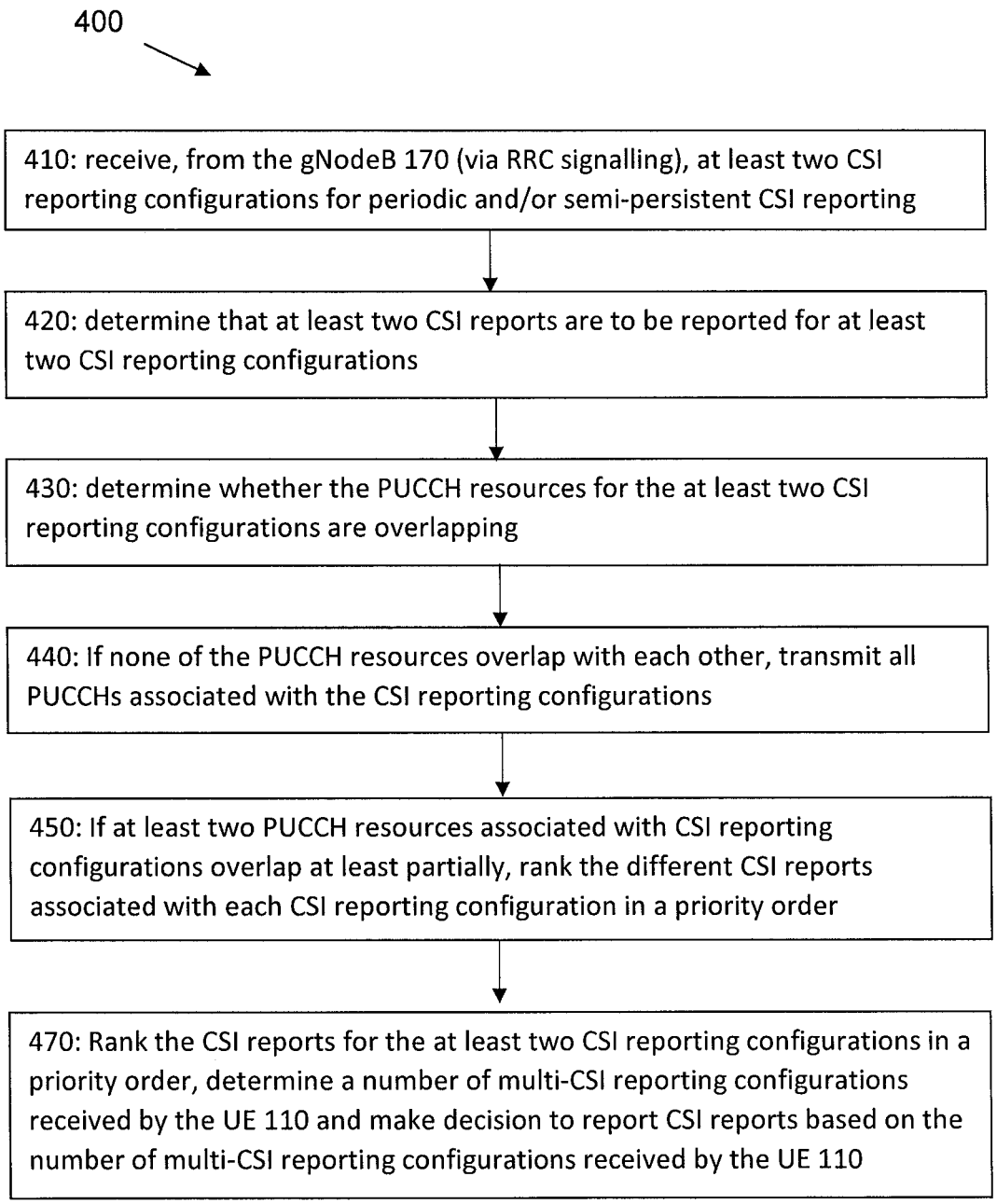
FIG. 4 shows a method in accordance with example embodiments which may be performed by an apparatus.

FIG. 4 is an example flow diagram 400 illustrating a method of multi-cell periodic reporting/SPS CSI reporting.

At block 410, UE 110 may receive, from the gNodeB 170 (via RRC signalling), at least two CSI reporting configurations for periodic and/or semi-persistent CSI reporting, each associated with a reportConfigId.

At block 420, UE 110 may determine that at least two CSI reports are to (for example, should) be reported for at least two CSI reporting configurations (for example, at least two reportConfigIds) in a slot.

UE 110 may determine whether the PUCCH resources for the at least two CSI reporting configurations are overlapping or not (at block 430).

If none of the PUCCH resources overlap with each other, UE 110 may transmit all PUCCHs associated with the CSI reporting configurations (at block 440).

If at least two PUCCH resources associated with CSI reporting configurations overlap at least partially, UE 110 may rank the different CSI reports associated with each CSI reporting configuration in a priority order (at block 450).

After ranking the CSI reports for the at least two CSI reporting configurations in a priority order (at block 450), UE 110 may determine a number of multi-CSI reporting configurations received by the UE 110 and make a decision to report CSI reports based on the number of multi-CSI reporting configurations received by the UE 110 (at block 460).

Without in any way limiting the scope, interpretation, or application of the claims appearing below, a technical effect of one or more of the example embodiments disclosed herein is to provide the rules necessary for multiplexing of periodic or semi-persistent CSI reports. The exemplary embodiments close the gap between the NR standards TS 38.213 and 38.214 in how the procedures related to periodic/semi-persistent CSI reporting are defined. The exemplary embodiments provide a procedure that allows for efficient use of PUCCH resources, for example, in the cases when the PUCCH resource for different reports are non-overlapping.

An example embodiment may provide a method comprising receiving, by a user device, from at least one base station, at least two CSI reporting configurations for at least one of periodic and semi-persistent CSI reporting; determining that at least two CSI reports are to be reported for the at least two CSI reporting configurations in a slot; determining whether Physical Uplink Control Channel (PUCCH) resources for the at least two CSI reporting configurations are overlapping in time on a carrier; and if none of the PUCCH resources are overlapping, transmitting all CSI reports on PUCCHs associated with the at least two CSI reporting configurations.

In accordance with one example embodiment, ranking different CSI reports associated with each of the at least two CSI reporting configurations in a priority order in response to a determination that at least two PUCCH resources associated with the at least two CSI reporting configurations overlap in time at least partially.

In accordance with one example embodiment, determining a number of multi-CSI reporting configurations, received by the user device, that are valid for a given slot and making a decision to report at least one of the different CSI reports based on a number of multi-CSI reporting configurations received by the user device.

In accordance with one example embodiment, determining at least one of: that the number of multi-CSI reporting configurations received by the user device is zero, and that the multi-CSI reporting configuration is not valid for the given slot; dropping all CSI reports except a CSI report with a highest priority; and transmitting the CSI report with the highest priority on a PUCCH resource configured for the CSI report with the highest priority.

In accordance with one example embodiment, performing prioritization and dropping only among CSI reports that have PUCCH resources overlapping.

In accordance with one example embodiment, determining that the number of multi-CSI reporting configurations received by the user device is one; calculating, based on a maximum code rate and a PUCCH resource allocation, a maximum number of bits supported for CSI reporting; selecting as many highest-priority reports for transmission without exceeding the maximum number of bits supported for CSI reporting; and dropping all remaining reports In accordance with one example embodiment, determining that the number of multi-CSI reporting configurations received by the user device is at least two multi-CSI reporting configurations; calculating, based on a maximum code rate and a PUCCH resource allocation, a maximum number of bits supported for CSI reporting for each of the at least two multi-CSI reporting configurations; determining whether the PUCCH resources for the at least two multi-CSI reporting configurations are overlapping; and in response to a determination that a calculated maximum number of bits for any of the at least two multi-CSI reporting configurations is smaller than the total number of bits in the at least two CSI reports that are to be reported for the at least two multi-CSI reporting configurations in a slot, keeping a multi-CSI reporting configuration with a largest amount of resources, and dropping all remaining reports In accordance with one example embodiment, if a multi-CSI reporting configuration associated to a long PUCCH overlaps with a multi-CSI reporting configuration associated to a short PUCCH, puncturing or rate matching the long PUCCH corresponding to an overlapping part; and identifying the multi-CSI reporting configuration associated to the long PUCCH and the multi-CSI reporting configuration associated to the short PUCCH as two non-overlapping multi-CSI reporting configurations.

In accordance with one example embodiment, determining that the PUCCH resources for the at least two multi-CSI reporting configurations are not overlapping; and using both configurations are used for transmitting the CSI reports in a slot.

In accordance with one example embodiment, wherein a maximum number of bits supported for CSI reporting is calculated separately for each multi-CSI reporting configuration based on a respective maximum code rate.

In accordance with one example embodiment, selecting a maximum number of highest-priority CSI reports for transmission without exceeding a maximum number of bits supported for CSI reporting for a first non-overlapping multi-CSI reporting configuration; and selecting a maximum number of CSI reports with a next highest priority without exceeding a maximum number of bits supported for CSI reporting for a next multi-CSI reporting configuration.

In accordance with one example embodiment, transmitting a highest priority CSI report via multiple multi-CSI reporting configurations to maximize a frequency/interference diversity.

An example embodiment may be provided in an apparatus comprising at least one processor; and at least one non-transitory memory including computer program code, the at least one memory and the computer program code may be configured to, with the at least one processor, cause the apparatus to: receive from at least one base station, at least two CSI reporting configurations for at least one of periodic and semi-persistent CSI reporting; determine that at least two CSI reports are to be reported for the at least two CSI reporting configurations; determine whether Physical Uplink Control Channel (PUCCH) resources for the at least two CSI reporting configurations are overlapping; and if none of the PUCCH resources are overlapping, transmit all PUCCHs associated with the at least two CSI reporting configurations.

In accordance with one example embodiment, if at least two PUCCH resources associated with the at least two CSI reporting configurations overlap at least partially, rank different CSI reports associated with each of the at least two CSI reporting configuration in a priority order.

In accordance with one example embodiment, determine a number of multi-CSI reporting configurations received by the apparatus and making a decision to report at least one of the different CSI reports based on a number of multi-CSI reporting configurations received by the apparatus.

In accordance with one example embodiment, determine at least one of: that the number of multi-CSI reporting configurations received by the user device is zero, and that the multi-CSI reporting configuration is not valid for the given slot: drop all CSI reports except a CSI report with a highest priority; and transmit the CSI report with the highest priority on a PUCCH resource configured for the CSI report with the highest priority.

In accordance with one example embodiment, determine that the number of multi-CSI reporting configurations received by the user device is one; calculate, based on a maximum code rate and a PUCCH resource allocation (including, for example the number of PUCCH symbols and PRBs), a maximum number of bits supported for CSI reporting; select as many as possible highest-priority reports for transmission without exceeding the maximum number of bits supported for CSI reporting; and drop all remaining reports.

In accordance with one example embodiment, determine that the number of multi-CSI reporting configurations received by the user device is at least two multi-CSI reporting configurations; determine whether the PUCCH resources for the at least two multi-CSI reporting configurations are overlapping; and in response to a determination that a calculated maximum number of bits for any of the at least two multi-CSI reporting configurations is smaller than the total number of bits in the at least two CSI reports that are to be reported for the at least two CSI reporting configurations in a slot, keep a multi-CSI reporting configuration with a largest amount of resources; and drop all remaining reports.

In accordance with one example embodiment, if a multi-CSI reporting configuration associated to a long PUCCH overlaps with a multi-CSI reporting configuration associated to a short PUCCH, puncture or rate match the long PUCCH corresponding to an overlapping part; and identify the multi-CSI reporting configuration associated to the long PUCCH and the multi-CSI reporting configuration associated to the short PUCCH as two non-overlapping multi-CSI reporting configurations.

In accordance with one example embodiment, transmit a highest priority CSI report via multiple multi-CSI reporting configurations to maximize a frequency/interference diversity.

In accordance with another example, an example apparatus comprises: means for receiving from at least one base station, at least two CSI reporting configurations for at least one of periodic and semi-persistent CSI reporting; means for determining that at least two CSI reports are to be reported for the at least two CSI reporting configurations; means for determining whether Physical Uplink Control Channel (PUCCH) resources for the at least two CSI reporting configurations are overlapping; and if none of the PUCCH resources are overlapping, means for transmitting all PUCCHs associated with the at least two CSI reporting configurations.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments, these descriptions should not be viewed in a limiting sense. Rather, there are several variations and modifications which may be made without departing from the scope of the present invention.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
   receiving, by a user device, from at least one base station, at least two Channel State Information (CSI) reporting configurations for at least one of periodic and semi-persistent CSI reporting;
   determining that at least two CSI reports are to be reported for the at least two CSI reporting configurations in a slot;
   determining whether Physical Uplink Control Channel (PUCCH) resources for the at least two CSI reporting configurations are overlapping in time on a carrier;

ranking the at least two CSI reports associated with the at least two CSI reporting configurations in a priority order in response to a determination that at least two PUCCH resources associated with the at least two CSI reporting configurations overlap in time at least partially;

determining a number of multi-CSI reporting configurations, received by the user device, that are valid for a given slot; and making a decision to report at least one of the at least two CSI reports based on the number of valid multi-CSI reporting configurations.

2. The method of claim 1, further comprising:
transmitting the at least two CSI reports on PUCCHs associated with the at least two CSI reporting configurations in response to a determination that none of the PUCCH resources are overlapping.

3. The method of claim 1, further comprising:
performing prioritization and dropping only among CSI reports that have PUCCH resources overlapping.

4. The method of claim 1, further comprising:
determining at least one of:
  that the number of multi-CSI reporting configurations received by the user device is zero, and
  that the multi-CSI reporting configuration is not valid for the given slot;
dropping all CSI reports except a CSI report with a highest priority; and
transmitting the CSI report with the highest priority on a PUCCH resource configured for the CSI report with the highest priority.

5. The method of claim 1, further comprising:
determining that the number of multi-CSI reporting configurations received by the user device is one;
calculating, based on a maximum code rate and a PUCCH resource allocation, a maximum number of bits supported for CSI reporting;
selecting as many highest-priority reports for transmission as possible without exceeding the maximum number of bits supported for CSI reporting; and
dropping all remaining reports.

6. The method of claim 1, further comprising:
determining that the number of multi-CSI reporting configurations received by the user device is at least two multi-CSI reporting configurations;
calculating, based on a maximum code rate and a PUCCH resource allocation, a maximum number of bits supported for CSI reporting for each of the at least two multi-CSI reporting configurations;
determining whether the PUCCH resources for the at least two multi-CSI reporting configurations are overlapping; and
in response to a determination that a calculated maximum number of bits for any of the at least two multi-CSI reporting configurations is smaller than the total number of bits in the at least two CSI reports that are to be reported for the at least two CSI reporting configurations in a slot, keeping a multi-CSI reporting configuration with a largest amount of resources in response to a determination that the PUCCH resources for at least two of the at least two multi-CSI reporting configurations are overlapping, and
dropping all remaining reports.

7. The method of claim 6, further comprising:
at least one of puncturing and rate matching a long PUCCH corresponding to an overlapping part in response to a determination that a multi-CSI reporting configuration associated to the long PUCCH overlaps with a multi-CSI reporting configuration associated to a short PUCCH; and
identifying the multi-CSI reporting configuration associated to the long PUCCH and the multi-CSI reporting configuration associated to the short PUCCH as two non-overlapping multi-CSI reporting configurations.

8. The method of claim 1, further comprising:
transmitting a highest-priority CSI report via multiple multi-CSI reporting configurations to maximize a frequency/interference diversity.

9. The method of claim 1, wherein the priority order comprises at least one of
  giving reports containing at least one of layer 1 Reference Signal Received Power (L1-RSRP) and only a CSI Resource Index (CRI) a higher priority than for other reports,
  giving reports containing a semi-persistent CSI reports a higher priority than for periodic CSI reports,
  giving the reports for at least one of a PCell and a PSCell a higher priority than for other reports, and
  giving the reports configured to be transmitted with at least one of a larger amount of PUCCH resources and a lower coding rate a higher priority than for other reports.

10. An apparatus, comprising:
at least one processor; and
at least one non-transitory memory including computer program code,
the at least one non-transitory memory and the computer program code configured to, with the at least one processor, cause the apparatus to:
  receive from at least one base station, at least two Channel State Information (CSI) reporting configurations for at least one of periodic and semi-persistent CSI reporting;
  determine at least two CSI reports are to be reported for the at least two CSI reporting configurations in a slot;
  determine whether Physical Uplink Control Channel (PUCCH) resources for the at least two CSI reporting configurations are overlapping in time on a carrier;
  rank the at least two CSI reports associated with the at least two CSI reporting configurations in a priority order in response to a determination that at least two PUCCH resources associated with the at least two CSI reporting configurations overlap in time at least partially;
  determine a number of multi-CSI reporting configurations, received by the apparatus, that are valid for a given slot; and
  make a decision to report at least one of the at least two CSI reports based on the number of valid multi-CSI reporting configurations.

11. The apparatus of claim 10, where the at least one non-transitory memory and the computer program code are further configured to, with the at least one processor, cause the apparatus to:
  transmit the at least two CSI reports on PUCCHs associated with the at least two CSI reporting configurations in response to a determination that none of the PUCCH resources are overlapping.

12. The apparatus of claim 10, where the at least one non-transitory memory and the computer program code are further configured to, with the at least one processor, cause the apparatus to:
  perform prioritization and dropping only among CSI reports that have PUCCH resources overlapping.

13. The apparatus of claim 10, where the at least one non-transitory memory and the computer program code are further configured to, with the at least one processor, cause the apparatus to:
  determine at least one of:
    that the number of multi-CSI reporting configurations received by the apparatus is zero, and
    that the multi-CSI reporting configuration is not valid for the given slot:
  drop all CSI reports except a CSI report with a highest priority; and
  transmit the CSI report with the highest priority on a PUCCH resource configured for the CSI report with the highest priority.

14. The apparatus of claim 10, where the at least one non-transitory memory and the computer program code are further configured to, with the at least one processor, cause the apparatus to:
  determine that the number of multi-CSI reporting configurations received by the apparatus is one;
  calculate, based on a maximum code rate and a PUCCH resource allocation, a maximum number of bits supported for CSI reporting;
  select as many highest-priority reports for transmission as possible without exceeding the maximum number of bits supported for CSI reporting; and
  drop all remaining reports.

15. The apparatus of claim 10, where the at least one non-transitory memory and the computer program code are further configured to, with the at least one processor, cause the apparatus to:
  determine that the number of multi-CSI reporting configurations received by the apparatus is at least two multi-CSI reporting configurations;
  calculate, based on a maximum code rate and a PUCCH resource allocation, a maximum number of bits supported for CSI reporting for each of the at least two multi-CSI reporting configurations;
  determine whether the PUCCH resources for the at least two multi-CSI reporting configurations are overlapping; and
  in response to a determination that a calculated maximum number of bits for any of the at least two multi-CSI reporting configurations is smaller than the total number of bits in the at least two CSI reports that are to be reported for the at least two CSI reporting configurations in a slot, keep a multi-CSI reporting configuration with a largest amount of resources in response to a determination that the PUCCH resources for at least two of the at least two multi-CSI reporting configurations are overlapping, and
  drop all remaining reports.

16. The apparatus of claim 10, where the at least one non-transitory memory and the computer program code are further configured to, with the at least one processor, cause the apparatus to:
  transmit a highest-priority CSI report via multiple multi-CSI reporting configurations to maximize a frequency/interference diversity.

17. The apparatus of claim 10, wherein the priority order comprises at least one of
  giving reports containing at least one of layer 1 Reference Signal Received Power (L1-RSRP) and only a CSI Resource Index (CRI) a higher priority than for other reports,
  giving reports containing a semi-persistent CSI reports a higher priority than for periodic CSI reports,
  giving the reports for at least one of a PCell and a PSCell a higher priority than for other reports, and
  giving the reports configured to be transmitted with at least one of a larger amount of PUCCH resources and a lower coding rate a higher priority than for other reports.

18. A computer program product comprising a non-transitory computer-readable medium bearing computer program code embodied therein for use with a computer, the computer program code comprising:
  receiving from at least one base station, at least two Channel State Information (CSI) reporting configurations for at least one of periodic and semi-persistent CSI reporting;
  determining at least two CSI reports are to be reported for the at least two CSI reporting configurations in a slot;
  determining whether Physical Uplink Control Channel (PUCCH) resources for the at least two CSI reporting configurations are overlapping in time on a carrier; and
  ranking the at least two CSI reports associated with the at least two CSI reporting configurations in a priority order in response to a determination that at least two PUCCH resources associated with the at least two CSI reporting configurations overlap in time at least partially;
  determining a number of multi-CSI reporting configurations that are valid for a given slot; and
  making a decision to report at least one of the at least two CSI reports based on the number of valid multi-CSI reporting configurations.

* * * * *